United States Patent
Kabasawa

[11] Patent Number: 6,111,864
[45] Date of Patent: Aug. 29, 2000

[54] HAND-OFF METHOD AND APPARATUS IN CDMA CELLULAR SYSTEM

[75] Inventor: Shizuko Kabasawa, Tokyo, Japan

[73] Assignee: NEC Corporation, Tokyo, Japan

[21] Appl. No.: 08/937,617

[22] Filed: Sep. 25, 1997

[30] Foreign Application Priority Data

Sep. 27, 1996 [JP] Japan .................................. 8-277322

[51] Int. Cl.$^7$ .................................................. H04Q 7/00
[52] U.S. Cl. ...................... 370/332; 370/335; 370/342; 455/437
[58] Field of Search ...................... 370/328, 329, 370/331, 332, 333, 334, 335, 336, 337, 342; 455/33.1, 33.2, 422, 436, 437, 440, 441, 442

[56] References Cited

U.S. PATENT DOCUMENTS

| | | | |
|---|---|---|---|
| 5,101,501 | 3/1992 | Gilhousen et al. | 455/442 |
| 5,267,261 | 11/1993 | Blakeney, II et al. | 370/332 |
| 5,345,467 | 9/1994 | Lomp et al. | 370/331 |
| 5,530,693 | 6/1996 | Averbuch et al. | 370/331 |
| 5,548,808 | 8/1996 | Bruckert et al. | 455/332 |
| 5,625,876 | 4/1997 | Gilhousen et al. | 370/331 |
| 5,640,679 | 6/1997 | Lundqvist et al. | 455/33.2 |
| 5,649,000 | 7/1997 | Lee et al. | 455/436 |
| 5,652,748 | 7/1997 | Jolma et al. | 370/320 |
| 5,749,044 | 5/1998 | Natarajan et al. | 455/13.1 |
| 5,749,053 | 5/1998 | Kusaki et al. | 455/524 |
| 5,771,451 | 6/1998 | Takai et al. | 455/442 |
| 5,794,149 | 8/1998 | Hoo | 455/438 |

FOREIGN PATENT DOCUMENTS

| | | |
|---|---|---|
| 7-50870 | 2/1995 | Japan . |
| 8-149551 | 6/1996 | Japan . |

*Primary Examiner*—Ajit Patel
*Assistant Examiner*—Bob A. Phunkulh
*Attorney, Agent, or Firm*—Sughrue, Mion, Zinn, Macpeak & Seas, PLLC

[57] ABSTRACT

In a hand-off method in a CDMA cellular system, whether a frequency in use is a frequency layer boundary is determined in response to a notification indicating a deterioration in the frequency in use from a mobile unit. A frequency prepared in both a communication cell and an adjacent cell is selected when the frequency in use is the frequency layer boundary. Inter-frequency hand-off is executed in the communication cell by using the selected frequency. Inter-cell hand-off is executed in response to a notification indicating a destination cell from the mobile unit, which is based on a pilot signal strength measurement result from the adjacent cell.

10 Claims, 4 Drawing Sheets

HAND-OFF METHOD AND APPARATUS IN CDMA CELLULAR SYSTEM

BACKGROUND OF THE INVENTION

The present invention relates to a CDMA (Code Division Multiple Access) mobile communication system and, more particularly, to a hand-off method and apparatus used at the boundary between frequency layers in a CDMA digital cellular system having a plurality of frequency layers.

In a CDMA digital cellular system based on the IS-95 communication means defined by TIA (Telecommunications Industry Association), a plurality of frequency layers are prepared in accordance with traffic. For example, a large number of frequency layers are prepared in a large-traffic area such as an urban area, whereas a small number of frequency layers are prepared in a small-traffic area such as a rural area.

According to the-hand-off scheme used in a conventional CDMA digital cellular system having a plurality of frequency layers, an adjacent cell at each frequency layer boundary indicating the boundary between frequencies has a device for transmitting only a pilot signal having the same frequency as the frequency layer of a self-cell so as to cause a mobile unit to send a notification indicating a destination cell, thereby performing switching (hand-off) to the frequency prepared in the adjacent cell. Alternatively, an adjacent cell has a device capable of measuring the strength of an electric field from a mobile unit using a frequency which is not assigned to the adjacent cell. With this arrangement, the system recognizes a destination cell from the measurement result, and performs hand-off to the frequency prepared in the adjacent cell.

The following problems are, however, posed in the above conventional scheme.

First, if a given frequency used in a given cell is not prepared in an adjacent cell, a device for transmitting only a pilot signal having the given frequency must be installed. Alternatively, a device for measuring the strength of an electric field from a mobile unit using a frequency which is not prepared in the self-cell must be installed. In any case, therefore, the equipment investment increases.

Second, it takes-much time to execute hand-off, so that a poor-speech-quality period is prolonged. This is because, the base station measures the strength of an electric field from a mobile unit upon reception of a notification indicating a deterioration in speech from the mobile unit. In addition, the possibility that the mobile unit will move out of the service area before the execution of hand-off increases.

Third, since a destination cell is determined after the strength of electric fields from all adjacent cells are measured, the time interval between the instant at which the mobile unit notifies the base station of a deterioration in speech quality and the instant at which hand-off is executed is longer than that in other schemes. For this reason, the second problem described above become more noticeable.

SUMMARY OF THE INVENTION

It is an object of the present invention to provide a hand-off method and apparatus, in a CDMA cellular system, which can perform inter-frequency hand-off to a frequency layer prepared in both a cell in which connection is established and a destination cell without using any additional device at a frequency layer boundary.

In order to achieve the above object, according to the present invention, there is provided a hand-off method in a CDMA cellular system, comprising the steps of determining, in response to a notification indicating a deterioration in a frequency in use from a mobile unit, whether the frequency in use is a frequency layer boundary, selecting a frequency prepared in both a communication cell and an adjacent cell when the frequency in use is the frequency layer boundary, executing inter-frequency hand-off in the communication cell by using the selected frequency, and executing inter-cell hand-off in response to a notification indicating a destination cell from the mobile unit, which is based on a pilot signal strength measurement result from the adjacent cell.

Description of the Preferred Embodiment

The present invention will be described in detail below with reference to the accompanying drawings.

Figure 1:
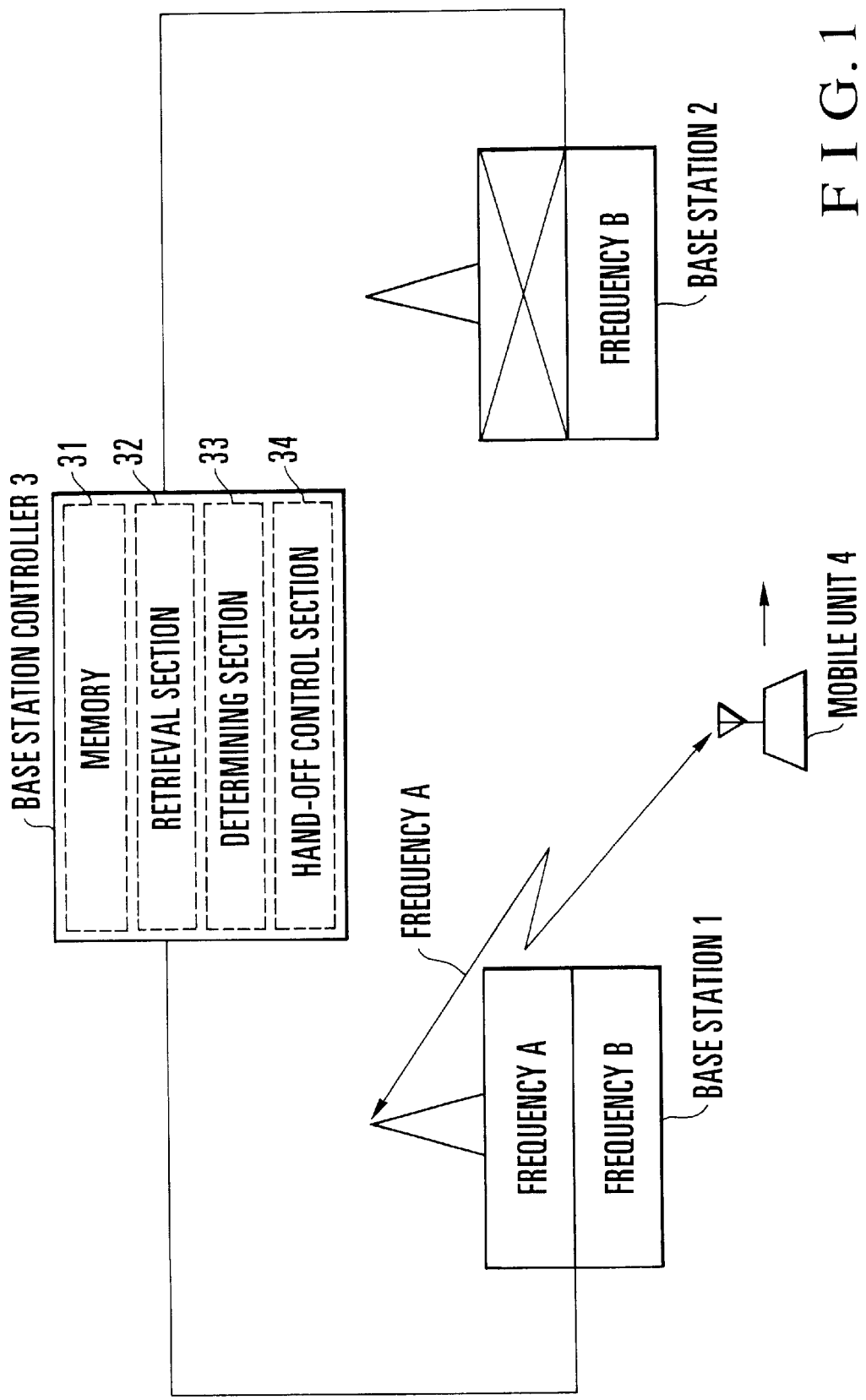
FIG. 1 is a block diagram showing the schematic arrangement of a CDMA digital cellular system at a frequency layer boundary according to an embodiment of the present invention.

FIG. 1 shows the arrangement of a CDMA digital cellular system at a frequency layer boundary according to an embodiment of the present invention. Referring to FIG. 1, a mobile unit 4 is moving from a base station 1 to a base station 2 while communicating at a frequency A. Two frequency layers, i.e., the frequency A and a frequency B, are prepared in the base station 1 because the necessary traffic is large. Only the frequency B is prepared in the second base station 2 because the necessary traffic is small. The base stations 1 and 2 are connected to a base station controller 3. The base station controller 3 controls the communicating operations of the base stations 1 and 2.

The base station controller 3 includes a memory 31 storing frequency configuration information having the data structure to be described later for each base station, a retrieval section 32 for retrieving and searching for frequency configuration information stored in the memory 31 in response to a notification from the mobile unit 4, a determining section 33 for determining a frequency layer boundary on the basis of the retrieval result obtained by the retrieval section 32, and a hand-off control section 34 for performing hand-off control in response to the determination result from the determining section 33 and a notification from the mobile unit 4. Note that the frequency layer boundary indicates that no adjacent cell has the same frequency as that used in the cell in which communication is being performed (communication cell), and the communication cell is the boundary of the frequency in use.

Figure 2:
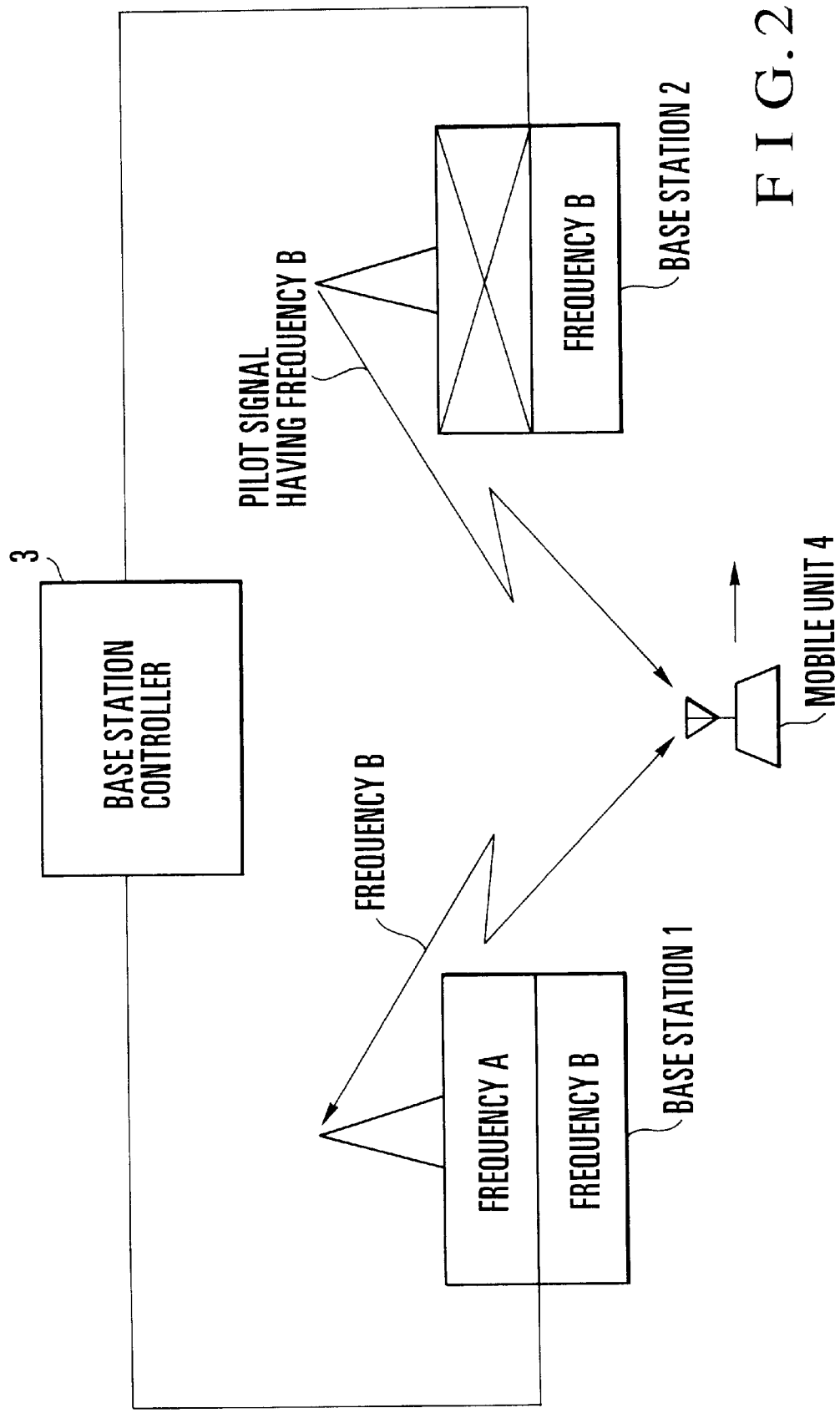
FIG. 2 is a bock diagram showing a connection state after inter-frequency hand-off in the CDMA digital cellular system in FIG. 1.

FIG. 2 shows the connection state between the mobile unit 4 and the base stations 1 and 2 after inter-frequency hand-off is executed in the cell of the base station 1. Referring to FIG. 2, the mobile unit 4 is communicating with the base station 1 at the frequency B, and is also measuring a pilot signal having the frequency B from the base station 2 in the cell of the base station 1.

Figure 3:
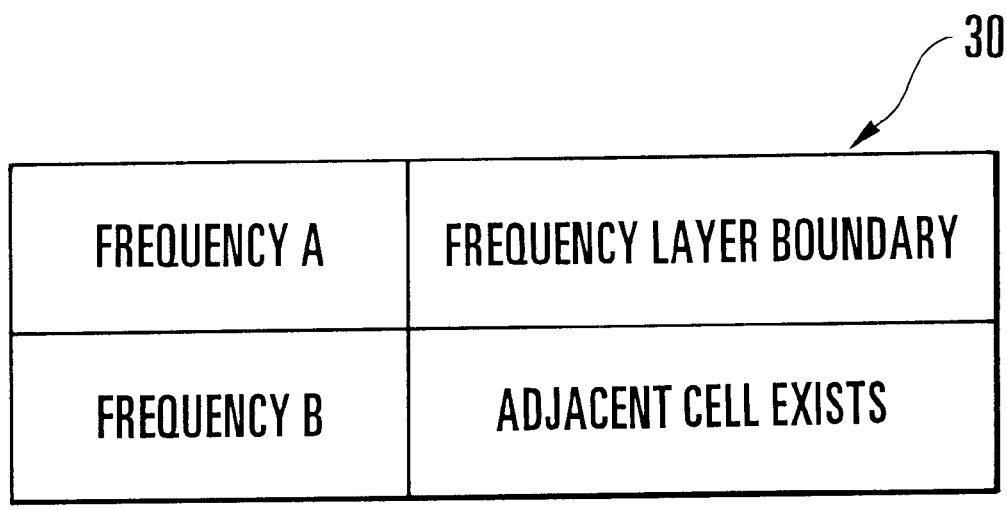
FIG. 3 is a view showing an example of the frequency configuration information stored in the memory of a base station controller in FIG. 1.

FIG. 3 shows an example of the structure of the data stored in the memory 31 of the base station controller 3 in FIG. 1, and more specifically, frequency configuration information 30 in the base station 1 which forms an omni-cell. If, for example, this frequency configuration information 30 is retrieved with the frequency A, it is found that the frequency in use in the cell of the base station 1 is "frequency layer boundary". If the frequency configuration information 30 is searched, information "adjacent cell exists" is read out with respect to the frequency B. It is therefore found that another frequency B prepared in the same cell is also used in the adjacent cell.

Figure 4:
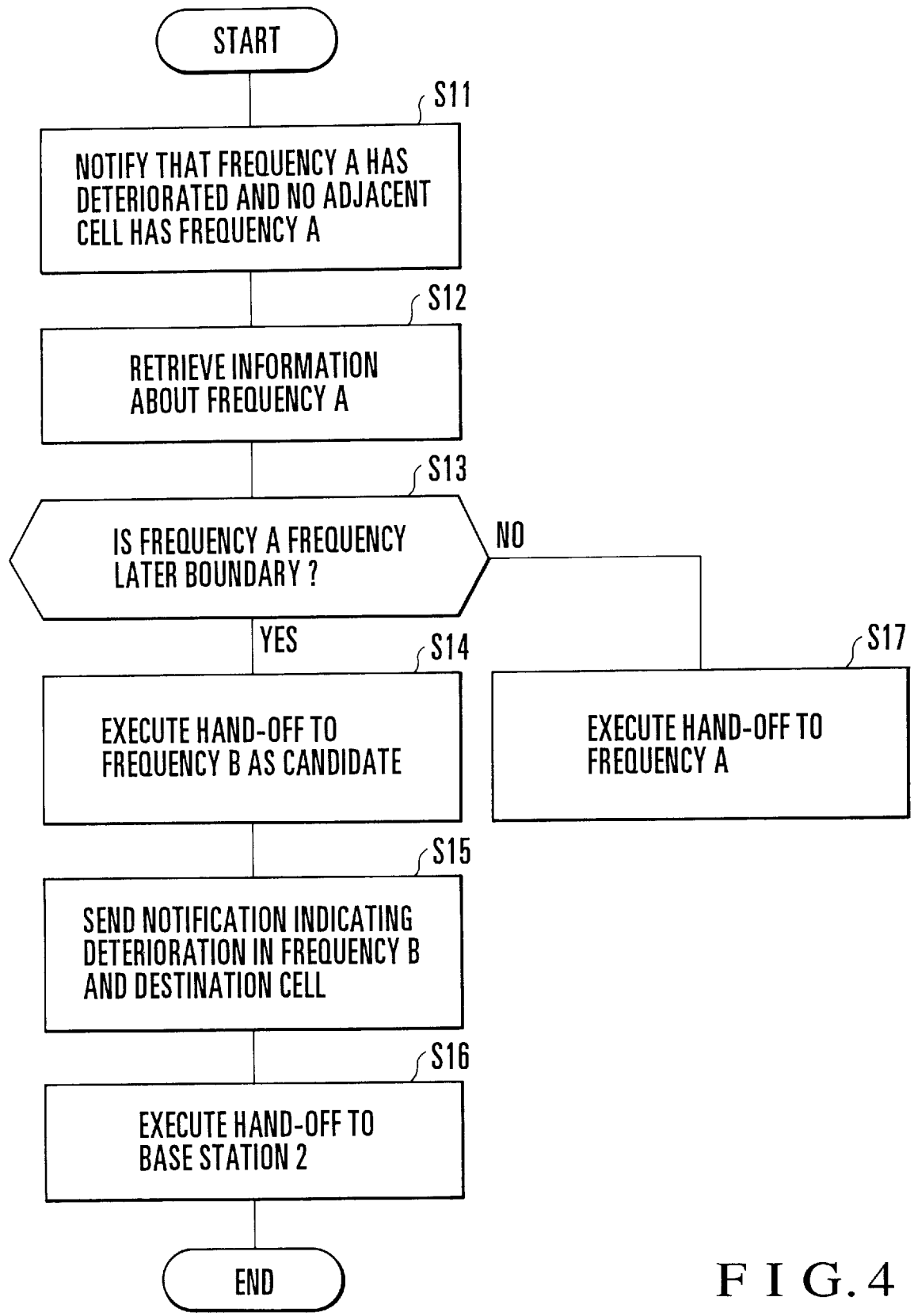
FIG. 4 is a flow chart for explaining a hand-off operation in the CDMA digital cellular system in FIG. 1.

The operation of the system having the above arrangement will be described next with reference to FIG. 4. The base station 1 cannot notify the mobile unit 4 of information indicating that the base station 2 is an adjacent cell as adjacent cell information about the frequency A. For this reason, when the mobile unit 4 moves to the boundary between the base station 1 and the base station 2 while communicating at the frequency A, the mobile unit 4 notifies the base station controller 3 through the base station 1 of a pilot strength measurement message indicating that the frequency A in the base station 1 has deteriorated beyond a defined value, and there is no adjacent cell having the frequency A (step S11).

In response to the notification from the mobile unit 4, the retrieval section 32 of the base station controller 3 retrieves the frequency configuration information 30 having the data structure shown in FIG. 3 (step S12). The determining section 33 determines on the basis of this retrieval result that the frequency A in use is a frequency layer boundary (step S13). If the determination result indicates the frequency layer boundary, the base station controller 3 determines that the mobile unit 4 must be handed off to the frequency indicated by "adjacent cell exists" of the frequency configuration information 30 in FIG. 3.

If the retrieval section 32 searches for the frequency configuration information 30 in FIG. 3 and identifies the frequency B as a candidate of the frequency corresponding to the information "adjacent cell exists", the hand-off control section 34 executes hand-off to the frequency B in the cell of the base station 1 (step S14). With hand-off to the frequency B, as shown in FIG. 2, the mobile unit 4 can continue communicating with the base station 1 at the frequency B, and can also measure a pilot signal having the frequency B from the base station 2. The mobile unit 4 determines the cell of the base station 2 as a destination cell by measuring the pilot signal having the frequency B sent from the base station 2 and satisfying the defined value. In this case, if the mobile unit 4 measures a plurality of pilot signals having the frequency B from a plurality of adjacent cells in which the frequency B is prepared, the adjacent cell which has sent the signal having the highest signal strength is determined as a destination cell.

Subsequently, the mobile unit 4 notifies the base station controller 3 through the base station 1 of a pilot signal strength measurement message indicating that the frequency B from the base station 1 has deteriorated beyond the defined value, and the pilot signal having the frequency B from the base station 2 has become a candidate, i.e., the cell of the base station 2 has become a destination cell (step S15). In response to this notification, the hand-off control section 34 of the base station controller 3 executes hand-off of the mobile unit 4 from the base station 1 to the base station 2 (step S16). With this operation, the speech communication state of the mobile unit 4 is held.

If it is determined in step S13 that the cell of the base station 1 is not the layer boundary of the frequency A, hand-off of the mobile unit 4 to the destination cell is performed without switching the frequency A.

As has been described above, according to the present invention, the following effects can be obtained.

The first effect of the present invention is that the equipment investment for system construction can be suppressed. This is because, any cells at frequency layer boundaries need not have a device capable of transmitting only a pilot signal having the same frequency as that prepared in an adjacent cell, or a device for measuring the electric field strength of a mobile unit, when the frequency prepared in the adjacent cell is not prepared in the self-cell.

The second effect of the present invention is that the time required for the execution of hand-off can be shortened, increasing the probability of success in holding speech communication. In addition, hand-off requests from many mobile units can be handled. This is because, in a system having a device capable of measuring the electric field strength of a mobile unit, there is no need to send an electric field measurement request to an adjacent cell for each mobile unit, which is performed by the base controller or the like in the prior art.

What is claimed is:

1. A hand-off method in a CDMA cellular system, comprising the steps of:

determining, in response to a notification indicating a deterioration in a frequency in use from a mobile unit, whether the frequency in use is a frequency layer boundary;

selecting a frequency prepared in both a communication cell and an adjacent cell when the frequency in use is the frequency layer boundary;

executing inter-frequency hand-off in the communication cell by using the selected frequency; and executing inter-cell hand-off in response to a notification indicating a destination cell from the mobile unit, which is based on a pilot signal strength measurement result from the adjacent cell.

2. A method according to claim 1, wherein the step of determining whether the frequency is the frequency layer boundary comprises the step of retrieving frequency layer boundary information corresponding to the frequency in use by referring to frequency configuration information stored in a memory in advance.

3. A method according to claim 1, wherein the step of selecting the frequency comprises the step of retrieving a frequency prepared in both the communication cell and the adjacent cell by referring to frequency configuration information stored in a memory in advance.

4. A method according to claim 1, wherein the frequency configuration information is constituted by information indicating whether a frequency prepared in each cell is a frequency layer boundary, and information indicating whether a frequency prepared in each cell is also prepared in an adjacent cell.

5. A hand-off apparatus in a CDMA cellular system, comprising:

a mobile unit;

a plurality of base stations having cells in which frequency layers are respectively prepared and adapted to perform radio communication with said mobile unit in the cell; and a controller to which said base stations are connected and which controls inter-frequency hand-off and inter-cell hand-off of said mobile unit, said controller including storage unit storing frequency configuration information of each frequency layer for each cell, determining means for determining on the basis of the frequency configuration information stored in said storage unit whether a frequency in use is a frequency layer boundary, in response to a notification indicating a deterioration in the frequency in use from said mobile unit, frequency selecting means for, when the determination result indicates that the frequency in use is the frequency layer boundary, selecting a frequency, of frequencies prepared in a communication cell, which is also prepared in an adjacent cell on the basis of the frequency configuration information stored in said storage unit, and hand-off control means for executing inter-frequency hand-off of said mobile unit in the communication cell by using the selected frequency, and executing inter-cell hand-off of said mobile unit in response to a notification indicating a destination cell from said mobile unit, which is based on a pilot signal strength measurement result from the adjacent cell.

6. An apparatus according to claim 5, wherein the frequency configuration information is constituted by first information indicating whether a frequency prepared in each cell is a frequency layer boundary, and second information indicating whether a frequency prepared in each cell is also prepared in an adjacent cell.

7. An apparatus according to claim 6, further comprising retrieval means for retrieving the first information corresponding to the frequency in use from the frequency configuration information stored in said storage unit and outputting the information to said determining means in response to the notification indicating the deterioration in the frequency in use from said mobile unit.

8. An apparatus according to claim 6, further comprising retrieval means for, when the determination result indicates that the frequency in use is the frequency layer boundary, retrieving a frequency prepared in both a communication cell and an adjacent cell from the second information of the frequency configuration information stored in said storage unit, and outputting the retrieved information to said frequency selecting means.

9. A hand-off apparatus in a CDMA cellular system, comprising:

a mobile unit;

a plurality of base stations having cells in which frequency layers are respectively prepared and adapted to perform radio communication with said mobile unit in the cell; and a controller to which said base stations are connected and which controls interfrequency hand-off and inter-cell hand-off of said mobile unit, said controller including:

a storage unit storing frequency configuration information of each frequency layer for each cell;

a determining section which determines, based on the frequency configuration information stored in said storage unit, whether a frequency in use is a frequency layer boundary, in response to a notification indicating a deterioration in the frequency in use from said mobile unit;

a retrieval section which, when the determination result indicates that the frequency in use is a frequency layer boundary, retrieves from the storage unit a second frequency of frequencies prepared in a communication cell, which second frequency is also prepared in an adjacent cell; and a hand-off control section which executes inter-frequency hand-off of said mobile unit in the communication cell by using the second frequency, and which executes inter-cell hand-off of said mobile unit in response to a notification indicating a destination cell from said mobile unit, which is based on a pilot signal strength measurement result from the adjacent cell.

10. An apparatus according to claim 9, wherein the frequency configuration information is constituted by first information indicating whether a frequency prepared in each cell is a frequency layer boundary, and second information indicating whether a frequency prepared in each cell is also prepared in an adjacent cell.

* * * * *